United States Patent
Narayan et al.

(10) Patent No.: US 9,779,013 B2
(45) Date of Patent: Oct. 3, 2017

(54) METHOD AND SYSTEM FOR OPTIMIZING A TEST SUITE COMPRISING PLURALITY OF TEST CASES

(71) Applicant: Wipro Limited, Bangalore (IN)

(72) Inventors: Ganesh Narayan, Bangalore (IN); Hemantha Kumar Choudam, Bangalore (IN); Gourav Kumar, Ludhiana (IN)

(73) Assignee: WIPRO LIMITED, Bangalore (IN)

( * ) Notice: Subject to any disclaimer, the term of this patent is extended or adjusted under 35 U.S.C. 154(b) by 0 days.

(21) Appl. No.: 15/052,055

(22) Filed: Feb. 24, 2016

(65) Prior Publication Data
US 2017/0199811 A1    Jul. 13, 2017

(30) Foreign Application Priority Data
Jan. 12, 2016 (IN) .............................. 201641001079

(51) Int. Cl.
*G06F 11/36* (2006.01)

(52) U.S. Cl.
CPC ................................ *G06F 11/3684* (2013.01)

(58) Field of Classification Search
CPC .................................................. G06F 11/3684
See application file for complete search history.

(56) References Cited

U.S. PATENT DOCUMENTS

| | | | |
|---|---|---|---|
| 5,629,878 A | 5/1997 | Kobrosly | |
| 7,167,870 B2 | 1/2007 | Avvari et al. | |
| 9,201,776 B1 | 12/2015 | Cohen et al. | |
| 9,299,009 B1 * | 3/2016 | Arora | G06F 3/0482 |
| 2003/0084127 A1 * | 5/2003 | Budhiraja | G06F 8/20 709/220 |
| 2009/0319567 A1 * | 12/2009 | Frazer | G06F 11/3688 |
| 2010/0287534 A1 * | 11/2010 | Vangala | G06F 11/3612 717/124 |
| 2012/0030651 A1 | 2/2012 | Kemmler et al. | |

OTHER PUBLICATIONS

Extended European search report from the European Patent Office for counterpart European Application No. EP 16 16 0712 dated Aug. 5, 2016.

\* cited by examiner

*Primary Examiner* — Viva Miller
(74) *Attorney, Agent, or Firm* — Finnegan, Henderson, Farabow, Garrett & Dunner LLP (57) ABSTRACT

The present disclosure relates to a method and system for optimizing a test suite comprising plurality of test cases. In an embodiment, the pluralities of test cases are received from data sources. The method identifies one or more redundant and non-redundant test cases among the plurality of test cases in the test suite and computes similarity percentage between each of the non-redundant test cases by comparing test description and steps of each non-redundant test case with test description and steps of other non-redundant test cases. The non-redundant test cases are grouped into clusters based on the similarity percentage. Further, the method identifies test functions in each of the clusters for determining reusable test functions. Upon identifying the reusable test functions, test cases in each of the clusters are reconstructed by replacing each of the test cases with the reusable test function references thereby optimizing the test suite.

16 Claims, 6 Drawing Sheets

METHOD AND SYSTEM FOR OPTIMIZING A TEST SUITE COMPRISING PLURALITY OF TEST CASES

TECHNICAL FIELD

The present subject matter is related, in general to software testing, and more particularly, but not exclusively to a method and system for optimizing a test suite comprising plurality of test cases.

BACKGROUND

In software engineering and development, software testing is carried out on software applications and/or software systems for rectifying faults in the software application and/or software systems. Generally, a test suite is used to test the software applications and/or the software systems. The test suite contains a plurality of test cases that are set of conditions under which a tester determines whether the one or more software applications and/or the software systems are working as they were originally designed to function. Each of the test cases have a set of test data, preconditions, expected results and post conditions, developed for a particular test scenario in order to verify compliance against a specific requirement. It is important to use an accurate test suite for testing a software application and/or software system or one of its features.

However, in any organization, test suites get generated and accumulated over a period of time for the software application and/or the software systems. These test cases or test scripts run into more than thousands and keep growing for every release of the software application and/or software systems. Over a period of time, a person/team working with the test suite would not have a clue on which test cases are current, which are obsolete, which need to be updated, how many are duplicates, etc. Whenever a major release of a software application and/or software system happens, the person/team finds it very hard to pick up a regression suite and execute it. Due to this, many defects get slipped through to production.

As an example, the regression suite for a banking application might contain the systems for account opening, transfer of funds, balance enquiry, application for a new card, etc. As time progresses, the bank may decide to add additional parameters to an account creation, such as Universal Account Number (or Social Security Number). The typical way of testing this will involve writing additional tests for ID creation and testing it, which will invalidate the existing suite of tests, for account creation. Moreover, the suites of tests which depict a particular functionality do not depict a business flow and will be extremely hard to maintain, as the steps will be voluminous.

The existing arts involve testing the software applications and/or software systems or one of its features without relying on the internal structure of the software applications and/or software systems or one of its features. In such cases, the one or more test cases comprising minimal paths or steps are used for the testing. However, such a way of testing does not solve the problems of identifying the one or more obsolete test cases in the suite, identifying one or more reusable test scenarios and eliminating redundant test scenarios from the one or more test cases.

The issues mainly faced in optimizing the test suite, comprising plurality of test cases, are identifying and eliminating redundant test cases, identifying reusable test functions of the test cases and generating an integrated business model using the reusable test functions to get an integrated view of the test suite.

SUMMARY

Disclosed herein is a method and system for optimizing a test suite comprising plurality of test cases. The method includes depicting, maintaining and updating an existing test suite in an integrated test environment by analyzing the test suite for redundancy, clustering the test cases into groups, creating reusable test functions and determining optimized test case functions.

Accordingly, the present disclosure relates to a method for optimizing a test suite comprising plurality of test cases. The method comprises receiving, by a test suite transformation system, the plurality of test cases from one or more data sources. The method identifies at least one of one or more redundant test cases and one or more non-redundant test cases among the plurality of test cases in the test suite. The test suite transformation system computes a similarity percentage between each of the one or more non-redundant test cases by comparing test description and test steps of each of the one or more non-redundant test cases with test description and the test steps of each of other non-redundant test cases. Each of the one or more non-redundant test cases are further grouped into one or more clusters based on the computed similarity percentage. The method further identifies one or more test functions in each of the one or more clusters for determining one or more reusable test functions in each of the one or more clusters. Furthermore, the one or more test cases in each of the one or more clusters are reconstructed by replacing each of the one or more test cases with the identified one or more reusable test function references thereby optimizing the test suite.

Further, the present disclosure relates to a test suite transformation system for optimizing a test suite comprising plurality of test cases wherein the test suite transformation system comprises a processor and a memory communicatively coupled to the processor, wherein the memory stores processor-executable instructions, which, on execution, causes the processor to receive plurality of test cases from one or more data sources. The instructions further cause the processor to identify at least one of one or more redundant test cases and one or more non-redundant test cases among the received plurality of test cases in the test suite. Thereafter, the system computes similarity percentage between each of the one or more non-redundant test cases by comparing test description and test steps of each of the one or more non-redundant test cases with test description and the test steps of each of other non-redundant test cases. Further, each of the one or more non-redundant test cases are grouped into one or more clusters based on the computed similarity percentage. The instructions further cause the processor to identify one or more test functions in each of the one or more clusters for determining one or more reusable test functions in each of the one or more clusters. Upon determining the one or more reusable test functions, the one or more test cases in each of the one or more clusters are reconstructed by replacing each of the one or more test cases with the identified one or more reusable test function references, thereby optimizing the test suite.

Furthermore, the present disclosure relates to a non-transitory computer readable medium including instructions stored thereon that when processed by at least one processor cause a test suite transformation to perform the acts of receiving the plurality of test cases from one or more data sources. The instructions further cause the test suite transformation system to identify at least one of one or more redundant test cases and one or more non-redundant test cases among the plurality of test cases in the test suite. Upon identifying the one or more non-redundant test cases, similarity percentage between each of the one or more non-redundant test cases is computed by comparing test description and test steps of each of the one or more non-redundant test cases with test description and the test steps of each of other non-redundant test cases. The instructions further cause the test suite transformation system to group each of the one or more non-redundant test cases into one or more clusters based on the similarity percentage. Thereafter, one or more test functions in each of the one or more clusters are identified for determining one or more reusable test functions in each of the one or more clusters. Furthermore, the one or more test cases in each of the one or more clusters are reconstructed by replacing each of the one or more test cases with the identified one or more reusable test function references, thereby optimizing the test suite.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and system for optimizing a test suite comprising plurality of test cases. In an embodiment, the plurality of test cases is received from one or more data sources. The method identifies one or more redundant and non-redundant test cases among the plurality of test cases in the test suite. A similarity percentage between each of the non-redundant test cases is computed by comparing test description and steps of each non-redundant test case with test description and steps of other non-redundant test cases. The non-redundant test cases are grouped into clusters based on the similarity percentage. Further, the method identifies test functions in each of the clusters for determining reusable test functions. Upon identifying the reusable test functions, test cases in each of the clusters are reconstructed by replacing each of the test cases with the reusable test function references, thereby optimizing the test suite.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1A:
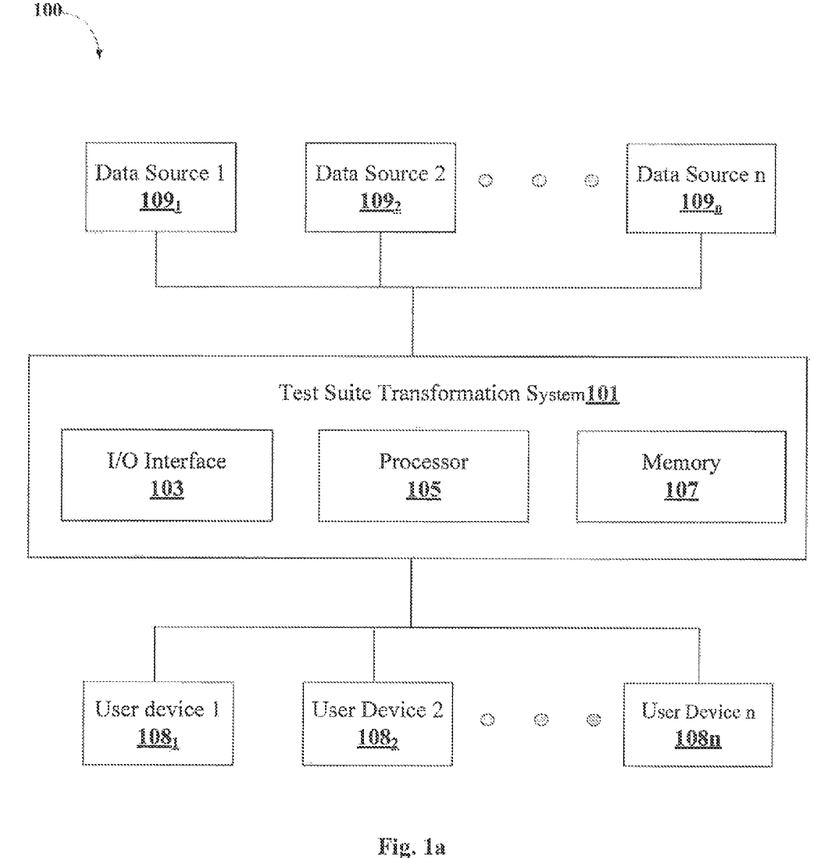
FIG. 1a shows an exemplary environment for optimizing a test suite comprising plurality of test cases in accordance with some embodiments of the present disclosure.

FIG. 1a shows an exemplary environment for optimizing a test suite comprising plurality of test cases in accordance with some embodiments of the present disclosure.

The environment 100 comprises of a test suite transformation system 101, one or more user devices, user device 1

108₁ to user device n 108n (collectively referred as user devices 108) and one or more data sources, data source 1 109₁ to data source n 109n (collectively referred as data sources 109). The one or more data sources 109 may include, but not limited to, a Test Management System (TMS). The TMS may further include one or more test management tools, such as, HP quality centre and Testlink, an Architecture of Integrated Information Systems (ARIS) model and the similar. In an embodiment, the test suite transformation system 101 may be implemented in a variety of user devices 108, such as a laptop computer, a desktop computer, a Personal Computer (PC), a notebook, a smartphone, a tablet, e-book readers (e.g., Kindles and Nooks), a node in a network, a server, a network server, and etc. In one implementation, the test suite transformation system 101 comprises an I/O interface 103, a processor 105 having one or more processing units, and a memory 107 in accordance with some embodiments of the present disclosure.

In an embodiment, the I/O interface 103 is a medium through which the test suite comprising the plurality of test cases 113 is received from the one or more user devices 108 and/or the one or more data sources 109. In an embodiment, the I/O interface 103 is used as the medium through which result of optimization of the test suite is provided to a display unit (not shown in FIG. 1) of the test suite transformation system 101 and/or to a display device associated to the one or more user devices 108. The I/O interface 103 is coupled with the processor 105. The processor 105 is configured to optimize the test suite having the plurality of test cases 113. In an embodiment, the memory 107 stores instructions which are executable by the at least one processor 105 for optimizing the test suite. In an embodiment, the memory 107 stores data 111 and modules 112.

In an embodiment, the test suite transformation system 101 may be communicatively connected to the one or more user devices 108 and the one or more data sources 109 over a communication network (not shown in FIG. 1a) for optimizing the test suite comprising a plurality of test cases 113. In an embodiment, the one or more user devices 108 are associated to the one or more users of the test suite. The one or more users may include, but not limited to, a Business Analysts (BA), a tester, etc. who are involved in testing the test suite comprising plurality of test cases 113. The one or more user devices 108 may include, but not limited to, computing systems such as a laptop computer, a desktop computer, a PC, a notebook, a smartphone and a tablet phone.

Figure 1B:
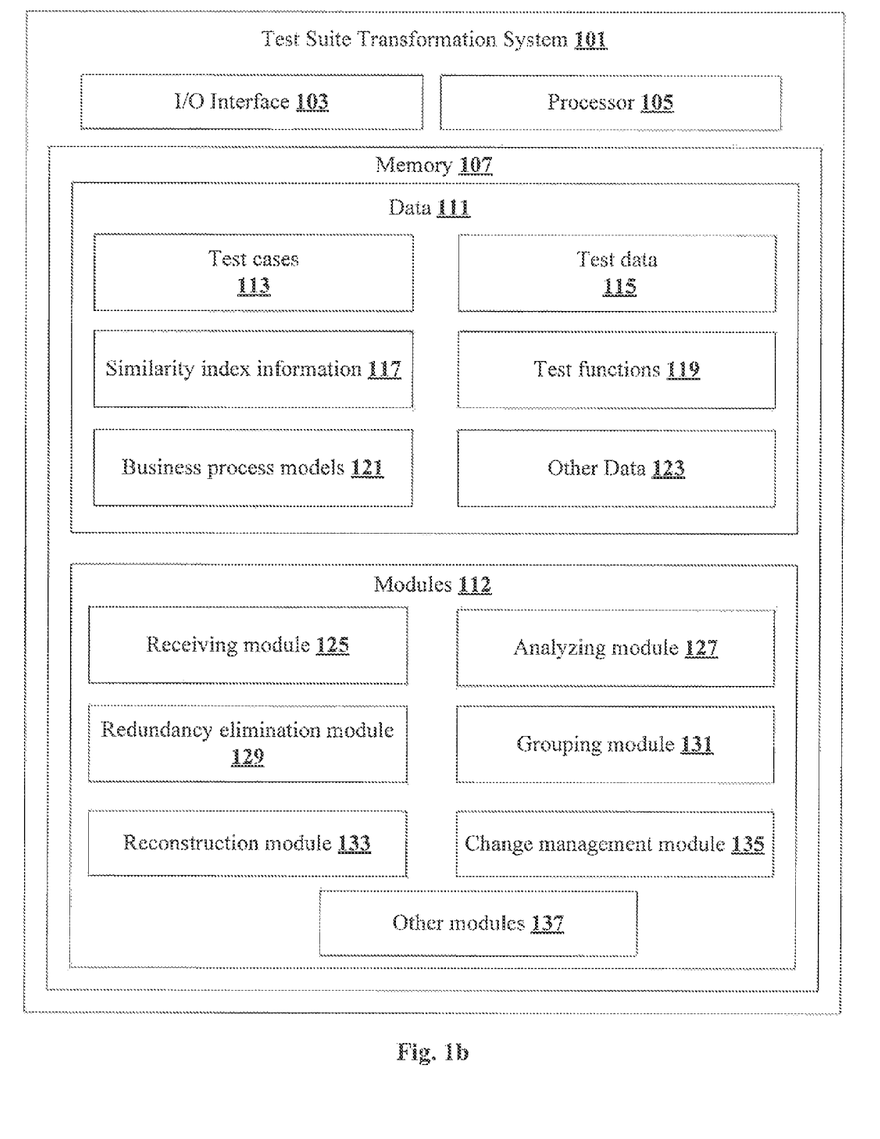
FIG. 1b shows a block diagram illustrating a test suite transformation system in accordance with some embodiments of the present disclosure.

FIG. 1b shows a block diagram illustrating a test suite transformation system in accordance with some embodiments of the present disclosure.

The one or more data 111 and the one or more modules 112 stored in the memory 107 are described herein in detail. In one implementation, the test suite transformation system 101 receives data 111 from one or more data sources 109. As an example, the data 111 may be stored within the memory 107. In an embodiment, the data 111 includes test cases 113, test data 115, similarity index information 117, test functions 119, business process models 121 and other data 123. The other data 123 may store data, including temporary data and temporary files, generated by modules 112 for performing the various functions of the test suite transformation system 101.

In an embodiment, the test cases 113 are received from one of one or more data sources 109 as the inputs for the test suite transformation system 101. The test cases are a series of test steps. Each test step provides a step description of the action to be performed by the test case and the expected result of the action performed. In an embodiment the one or more test steps of the plurality of test cases 113 may be grouped to form a test function 119. Each of the test functions 119 provides a sub-function of the plurality of test cases 113. As an example, a test case written for testing an employee management system in an organization may comprise a series of test steps for performing one or more functionalities of the application. These functionalities may include, without limitation, verifying employee identity, verifying employee specific passwords, receiving leave requests, updating the employee records and etc. In such a case, the one or more test steps concerning to a specific functionality may be grouped together to form a single test function 119, thereby simplifying the test case. In an embodiment, the test data 115 is the data required for executing the test cases 113. In an embodiment, the similarity index information 117 may include one or more parameters, such as similarity percentage, user defined similarity index, similarity criterions and other related parameters for identifying one or more similar and/or redundant test cases in the test suite. As an example, the similarity percentage between each of the one or more non-redundant test cases may be calculated by comparing test description and test steps of each of the one or more non-redundant test cases with test description and the test steps of each of other non-redundant test cases in the test suite.

In an embodiment, the business process models 121 are the flowchart models that classify and depict each of the one or more non-redundant test cases across multiple levels in the test suite. The business process models 121 help in easy analysis and improvement of the one or more non-redundant cases, thereby increasing the speed of optimization process.

In an embodiment, the data 111 stored in the memory 107 are processed by the modules 112 of the test suite transformation system 101. The modules 112 may be stored within the memory 107 as shown in FIG. 1b. In an example, the modules 112, communicatively coupled to the processor 105, may also be present outside the memory 107.

In one implementation, the modules 112 may include, for example, a receiving module 125, analyzing module 127, redundancy elimination module 129, grouping module 131, reconstruction module 133 and a change management module 135. The other modules 137 may be used to perform various miscellaneous functionalities of the test suite transformation system 101. It will be appreciated that such aforementioned modules 112 may be represented as a single module or a combination of different modules.

In an embodiment, the receiving module 125 receives the test suite comprising the plurality of test cases 113 from the one or more data sources 109. Additionally, the receiving module 125 may also receive the one or more test data 115 that are necessary for executing each of the plurality of test cases 113. In an embodiment, the plurality of test cases 113 and the test data 115 may be stored in one of the widely used formats, such as a spreadsheet, text file or as a database in the memory 107. The receiving module 125 may also receive the similarity index information 117 from the one or more users of the test suite via the user devices 108.

In an embodiment, the analyzing module 127 retrieves the plurality of test cases 113 and test data 115 from the receiving module 125 and performs an initial analysis of the received plurality of test cases 113 and test data 115. This initial analysis by the analyzing module 127 may also identify one or more redundancies in the received test cases by comparing syntax and semantics of each of the plurality of test cases 113.

In an embodiment, the redundancy elimination module 129 scans through the analyzed plurality of test cases 113 for classifying the plurality of test cases 113 into various clusters. The redundancy elimination module 129 first eliminates a series of non-textual characters such as, ",", ".", white spaces, etc., from the plurality of test cases 113 and test data 115. In an embodiment, the list of non-textual characters, to be eliminated by the redundancy elimination module 129 may be received as a user input via the I/O interface 103. Table A and Table B shown below illustrate the process of eliminating one or more non-textual characters from the plurality of test cases 113 and test data 115. Upon completing the elimination of the non-textual characters, one or more test steps in each of the plurality of test cases 113 are collected as a single test string. In an embodiment, the test steps are the combination of test description and expected outcome on executing one of the plurality of test cases 113.

In an embodiment, the test strings, as collected above for each of the plurality of test cases 113, are compared by the redundancy module, in cases where the test string of one of the plurality of test cases 113 is same as the test string of one of the other test case, the former test case is marked to as redundant. Further, the test string comparison is repeated for each of the plurality of test cases 113 and the redundant test cases are eliminated.

In an embodiment, one or more machine learning and/or a natural language processing technique may be used for eliminating the redundant test cases, using which the test suite transformation system 101 continuously learns the method of elimination over a period of time. As an example, sentences such as "Unable to" and "Not able to", get matched as same by the test suite transformation system 101 since the machine learning and/or natural language technique interpret both the above sentences to be the same sentences.

In an embodiment, upon eliminating each of the redundant test cases, the one or more non-redundant test cases remaining in the test suite are grouped into clusters based on the similarity percentage in the test strings of each of the non-redundant test cases. Here, the similarity percentage refers to the extent to which the test strings match. As an example, consider 2 strings such as "Verify positive Login to application" and "Verify negative Login to application". In this case, both the strings might record an 89% similarity percentage, as there is only a difference of 4 letters in one word "positive" and "negative" of the respective strings.

In an embodiment, a clustering algorithm such as, but not limited to, "K-means" may be used to categorize the one or more test strings of the one or more non-redundant cases into one or more clusters, based on the identified similarity percentage between the respective test strings. In an embodiment, the one or more test strings may be categorized to one or more clusters based on a user defined similarity index. As an example, the user may request for a similarity index of 80%, which means that, each of the one or more test strings having the similarity percentage of more than 80% may be grouped into a single cluster. Further, the number of clusters to be created in the test suite may also be received as a configurable user input from the users through the I/O interface 103.

In an embodiment, the grouping module 131 receives the one or more clusters of test cases as input and breaks down the one or more non-redundant test cases in each of the one or more clusters into a series of test step blocks, called, test functions 119. Each test function 119 is a series of test steps, which performs a small sub-set of the entire test case. These test functions 119 may also be obtained by analyzing one or more test steps using the natural language processing techniques in order to maximize the probability of finding a match between the one or more test steps of the one or more non-redundant test cases. Further, these natural language techniques ensure that if 2 test cases are written differently, the probability of finding a reusable test function is still high, even if some differences exist in the syntax of the respective test cases.

In an embodiment, the grouping module 131 identifies one or more reusable test functions among the one or more test functions 119 in each of the one or more clusters. The one or more reusable test functions may be determined by identifying a source test function having maximum test string length and comparing each of the other test functions 119 with the source test function. Upon detecting an exact match, the source test function is marked as reusable and the matching test function is eliminated and/or removed from the test suite.

In an embodiment, the reconstruction module 133 reconstructs each of the reusable test functions identified by the grouping module 131. During reconstruction, the repeated test steps in the test cases, as described above, get replaced with the corresponding reusable test function references.

As an example, consider 4 test cases, TC1 to TC2, having one or more test steps and corresponding step description for each of the test steps as shown in Table A. The redundancy elimination module 129 scans through each of these test cases TC1 to TC2 to identify and eliminate one or more non-textual characters in the one or more test steps and step description. The table, Table B below shows the test cases (TC1 to TC4) and the corresponding test steps, step description and expected result of executing the test steps which are free from the non-textual characters. Here, the number of test steps in each of the test cases, TC1 to TC4, may be different depending on the purpose for which the test cases are considered. Further, as may be seen in the Table B, the test steps, step 1 to step 3 perform the same task in each of the test cases TC1 to TC4 and hence may be marked as duplicate test steps. Similarly, the test step 4 and test step 5 of the TC1 are same as the test step 7 and test step 8 of the test cases TC2, TC3 and TC4.

TABLE A

| Test case ID | Test Step ID | Step description | Expected result |
|---|---|---|---|
| TC1 | Step1 | Navigate to login | Navigation successful |
| TC1 | Step2 | Enter username, password | Entered |
| TC1 | Step3 | Click on Login. | Login successful. |
| TC1 | Step4 | Click on Logout | Message displayed |
| TC1 | Step5 | Click on confirmation message | Logout successful |
| TC2 | Step1 | Navigate to login | Navigation successful |
| TC2 | Step2 | Enter username & password | Entered |
| TC2 | Step3 | Click on Login. | Login successful |

TABLE A-continued

| Test case ID | Test Step ID | Step description | Expected result |
|---|---|---|---|
| TC2 | Step4 | Go to Home page | Home page displayed |
| TC2 | Step5 | Go to Leave module | Leave page displayed |
| TC2 | Step6 | Apply leave | Leave applied |
| TC2 | Step7 | Click on Logout | Message displayed |
| TC2 | Step8 | Click on confirmation message | Logout successful |
| TC3 | Step1 | Navigate to login | Navigation successful |
| TC3 | Step2 | Enter username, password | Entered |
| TC3 | Step3 | Click on Login | Login successful |
| TC3 | Step4 | Go to Home page | Home page displayed |
| TC3 | Step5 | Click on Attendance module | Attendance page displayed |
| TC3 | Step6 | Edit attendance | Edit successful |
| TC3 | Step7 | Click on Logout | Message displayed. |
| TC3 | Step8 | Click on confirmation message | Logout successful |
| TC4 | Step1 | Navigate to login | Navigation successful |
| TC4 | Step2 | Enter username, password | Entered |
| TC4 | Step3 | Click on Login | Login successful |
| TC4 | Step4 | Go to Home page. | Home page displayed |
| TC4 | Step5 | Click on Transport module. | Transport page displayed |
| TC4 | Step6 | Apply for bus pass. | Application submitted successfully |
| TC4 | Step7 | Click on Logout | Message displayed |
| TC4 | Step8 | Click on confirmation message | Logout successful |

TABLE B

| Test case ID | Test Step ID | Step description | Expected result |
|---|---|---|---|
| TC1 | Step1 | Navigate to login | Navigation successful |
| TC1 | Step2 | Enter username password | Entered |
| TC1 | Step3 | Click on Login | Login successful |
| TC1 | Step4 | Click on Logout | Message displayed |
| TC1 | Step5 | Click on confirmation message | Logout successful |
| TC2 | Step1 | Navigate to login | Navigation successful |
| TC2 | Step2 | Enter username password | Entered |
| TC2 | Step3 | Click on Login | Login successful |
| TC2 | Step4 | Go to Home page | Home page displayed |
| TC2 | Step5 | Go to Leave module | Leave page displayed |
| TC2 | Step6 | Apply leave | Leave applied |
| TC2 | Step7 | Click on Logout | Message displayed |
| TC2 | Steps | Click on confirmation message | Logout successful |
| TC3 | Step1 | Navigate to login | Navigation successful |
| TC3 | Step2 | Enter username password | Entered |
| TC3 | Step3 | Click on Login | Login successful |
| TC3 | Step4 | Go to Home page | Home page displayed |
| TC3 | Step5 | Click on Attendance module | Attendance page displayed |
| TC3 | Step6 | Edit attendance | Edit successful |
| TC3 | Step7 | Click on Logout | Message displayed |
| TC3 | Steps | Click on confirmation message | Logout successful |
| TC4 | Step1 | Navigate to login | Navigation successful |
| TC4 | Step2 | Enter username password | Entered |
| TC4 | Step3 | Click on Login | Login successful |
| TC4 | Step4 | Go to Home page | Home page displayed |
| TC4 | Step5 | Click on Transport module | Transport page displayed |
| TC4 | Step6 | Apply for bus pass | Application submitted successfully |
| TC4 | Step7 | Click on Logout | Message displayed |
| TC4 | Step8 | Click on confirmation message | Logout successful |

In embodiment, in order to remove the duplicate/repeating test steps across one or more test cases, the reconstruction module 133 may group each of the repeating test steps into a single test block, called the reusable test block. Upon detecting the reusable test block, the reconstruction module 133 replaces each of the one or more repeating test blocks with a reference to the reusable test block, in order to eliminate the repeating steps in the test case. Table C shown below illustrates the reconstruction of the test cases TC1 to TC4 after replacing each of the repeating test steps (step 1 to step 3 and step 7, step 8 of TC2 to TC4) by the reusable test steps (step 1 to step 3 of TC1 and step 4 to step 5 of TC1).

TABLE B

| Test case ID | Step ID | Step description | Expected result |
|---|---|---|---|
| TC1_new | Step1 | Block1 | |
| TC1_new | Step2 | Block2 | |
| TC2_new | Step1 | Block1 | |
| TC2_new | Step2 | Go to Home page | Home page displayed |

TABLE B-continued

| Test case ID | Step ID | Step description | Expected result |
|---|---|---|---|
| TC2_new | Step3 | Go to Leave module | Leave page displayed |
| TC2_new | Step4 | Apply leave | Leave applied |
| TC2_new | Step5 | Block2 | |
| TC3_new | Step1 | Block1 | |
| TC3_new | Step2 | Go to Home page | Home page displayed |
| TC3_new | Step3 | Click on Attendance module | Attendance page displayed |
| TC3_new | Step4 | Edit attendance | Edit successful |
| TC3_new | Step5 | Block2 | |
| TC4_new | Step1 | Block1 | |
| TC4_new | Step2 | Go to Home page | Home page displayed |
| TC4_new | Step3 | Click on Transport module | Transport page displayed |
| TC4_new | Step4 | Apply for bus pass | Application submitted successfully |
| TC4_new | Step5 | Block2 | |

Figure 2A:
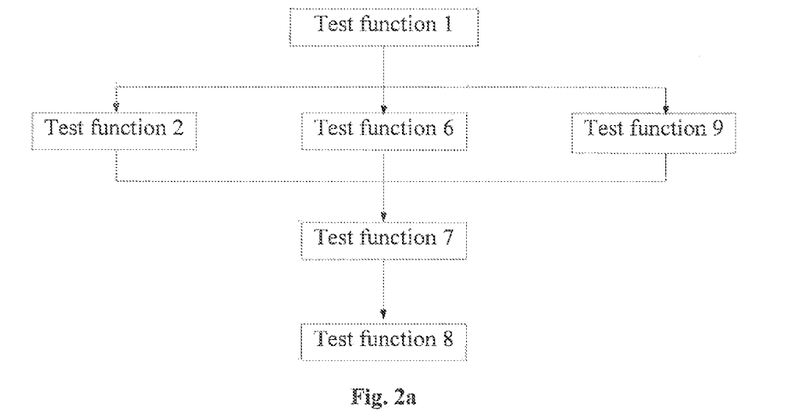
FIG. 2a shows an exemplary business process model generated for each of one or more clustered test cases in the test suite in accordance with some embodiments of the present disclosure.

In an embodiment, upon reconstructing the one or more non-redundant test cases in the one or more clusters, the same is represented pictorially in a business process model 121. The business process model 121 is generated by scanning through each of the one or more test cases in each of the one or more clusters. The business process model 121 depicts the interaction between each of the reusable test blocks in the one or more clusters by means of a pictorial notation, such as the representation as shown in FIG. 2*a*. FIG. 2*a* shows an exemplary representation of the interaction between the one or more reusable test functions. Here, the test function 1 is related to test function 2, test function 6 and test function 9, which are in turn related to test function 7.

Figure 2B:
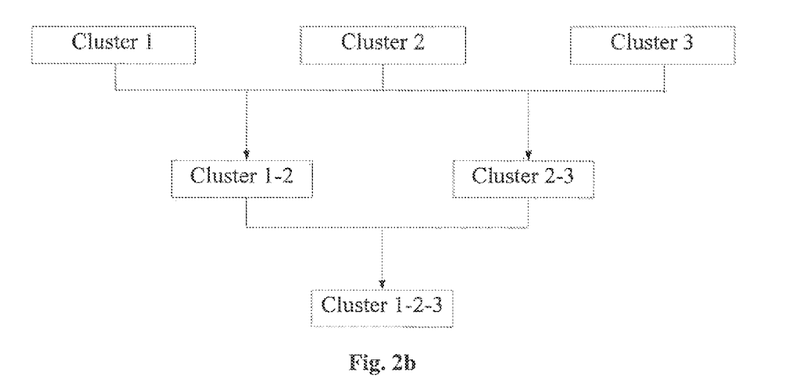
FIG. 2b shows an integrated business model in accordance with an exemplary embodiment of the present disclosure.

In an embodiment, after the one or more business process models 121 are generated for each of the one or more test cases in each of one or more test dusters, the grouping of test clusters shall be performed, to derive an integrated business model. The integrated business model includes only the constituent clusters of the test suite, thus optimizing the test suite. As shown in FIG. 2*b*, Cluster 1 & Cluster 2 form an integrated Cluster 1-2 and Clusters 1, 2 & 3 form an end-to-end testing Cluster 1-2-3. This integrated business model provides an integrated view of the system.

Figure 2C:
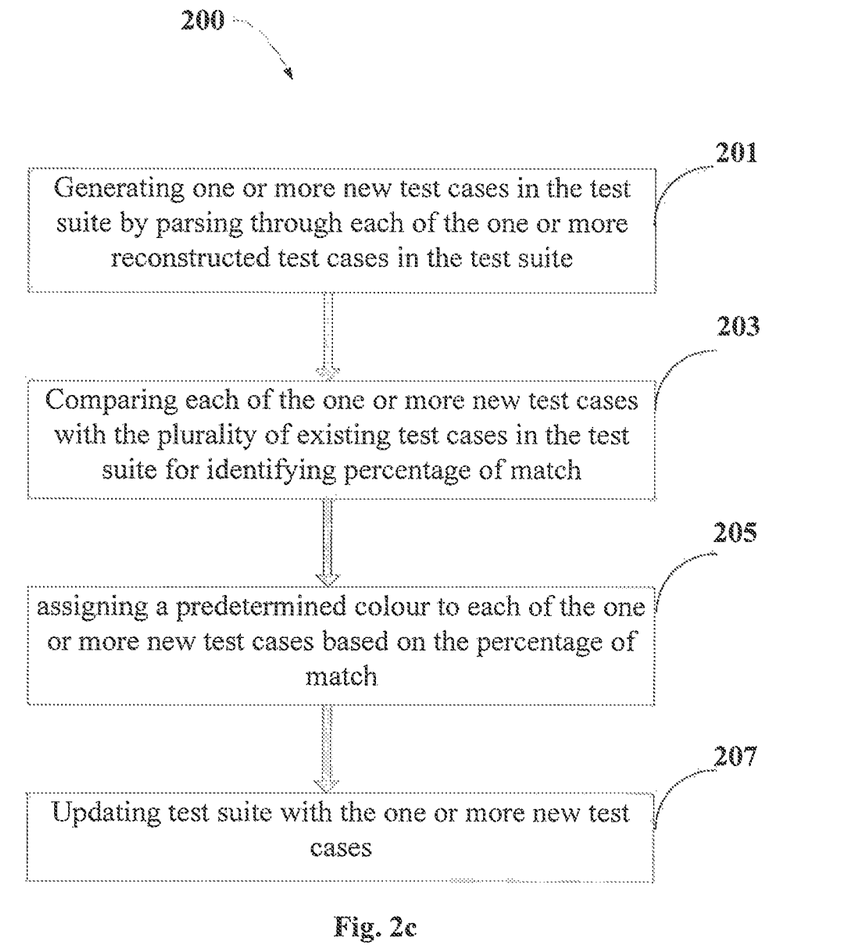
FIG. 2c illustrates a flowchart showing method for performing one or more change management operations on the test suite in accordance with some embodiments of the present disclosure.

In an embodiment, the test suite transformation system 101 uses the change management module 135 for performing one or more change management operations on the test suite in order to identify the reconstructed and/or changed test cases in the test suite. The method for identifying the changed test cases is illustrated in FIG. 2*c*. At block 201, one or more test cases are generated by parsing through each of the one or more reconstructed test cases in the test suite. At block 203, each of the one or more new test cases are compared with the one or more test cases existing in the test suite for determining the percentage of match between the existing and the new test cases. At block 205, a predetermined color is assigned to each of the one or more new test cases based on the determined percentage of match. As an example, all 100% matches are denoted as "Green", meaning that such test cases require no further changes. Similarly, each of the new test cases having a partial match with the existing test cases are denoted as "Amber", meaning that such test cases require one or more further action to be performed. The partial match can be found in any one of the cases including, but not limiting to, when a critical test function is missing from the original sequence of test functions 119 in a test case, when a new test function is added to the sequence of test functions 119 in a test case and when multiple test functions are added and/or removed from the sequence of test functions 119 in a test case. In a further embodiment, completely new sequences of test functions 119 in the one or more test cases are denoted "Blank", meaning that these test cases further get translated into new test cases. Similarly, the one or more eliminated test functions 119 are denoted as "Red", meaning that these test cases get deleted from the test cases listed in the test suite. At block 207, the test suite is updated with one or more new test cases after the above comparisons are performed, thereby consolidating the test suite with the one or more optimized test cases.

Figure 3:
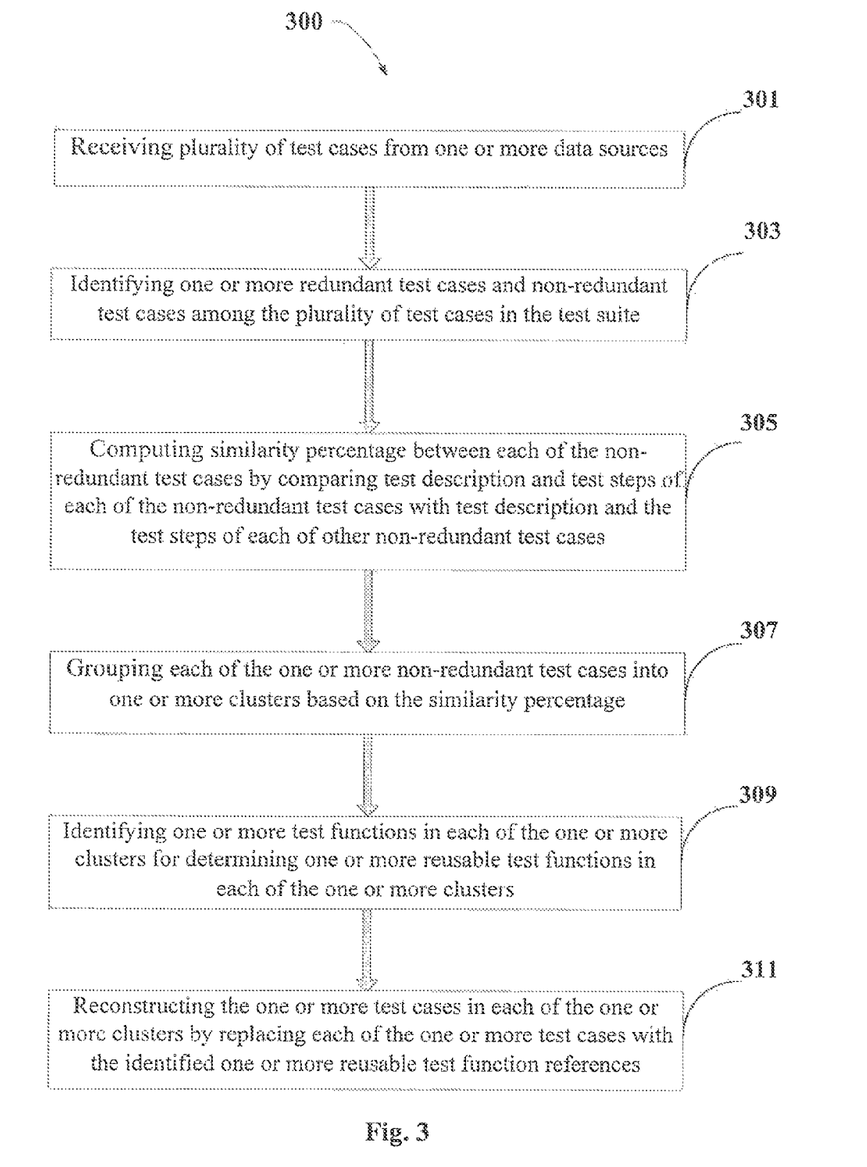
FIG. 3 illustrates a flowchart showing method for optimizing a test suite comprising plurality test of cases in accordance with some embodiments of the present disclosure.

FIG. 3 illustrates a flowchart showing method for optimizing a test suite comprising plurality of test cases in accordance with some embodiments of the present disclosure.

As illustrated in FIG. 3, the method 300 comprises one or more blocks for optimizing a test suite using a test suite transformation system 101. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, the test suite transformation system 101 receives the plurality of test cases 113 from one or more data sources 109 using the receiving module 125. Each of the received test cases comprises a test description and one or more test steps and is stored in the memory 107 of the test suite transformation system 101. As an example, the one or more data sources 109 may include, hut not limited to, at least one of a test management system, a storage unit storing plurality of test cases 113 and a test management tool.

At block 303, the test suite transformation system 101 identifies at least one of one or more redundant test cases and one or more non-redundant test cases among the plurality of test cases 113 in the test suite. As an example, the plurality of test cases 113 in the test suite are considered to be redundant upon detecting that the test description and test steps of the plurality of test cases 113 are 95% similar to test description and test steps of one or more other test cases in the test suite. In an embodiment, the one or more redundant test cases are eliminated from the test suite.

At block 305, the test suite transformation system 101 computes similarity percentage between each of the one or more non-redundant test cases by comparing test description and test steps of each of the one or more non-redundant test cases with test description and the test steps of each of other non-redundant test cases.

At block 307, the test suite transformation system 101 groups each of the one or more non-redundant test cases into one or more clusters based on the similarity percentage. In an embodiment, a combination of the test description, test steps and an expected outcome of a test step in each of the test cases are collected as a single string. These strings of data across different test cases may be checked and in cases where both description and steps are found to be same, the redundant test cases are eliminated from the test suite before clustering.

At block 309, the test suite transformation system 101 identifies one or more test functions 119 in each of the one or more clusters for determining one or more reusable test functions in each of the one or more clusters. The test functions 119 are a series of test steps, which perform a small sub-set of the entire test case. The test functions 119 are identified using at least one of a natural language processing and a machine learning technique.

At block 311, the test suite transformation system 101 reconstructs the plurality of test cases 113 in each of the one or more clusters by replacing each of the plurality of test cases 113 with the identified one or more reusable test function references. The one or more reusable test function references are paths referring to location of the one or more reusable test functions in the one or more clusters. In an embodiment, the test suite transformation system 101 may further comprise generating one or more business process models 121 for each of the one or more reusable test functions wherein each of the one or more business process models 121 are further used to generate an integrated business model for obtaining an integrated view of the test suite.

Computer System

Figure 4:
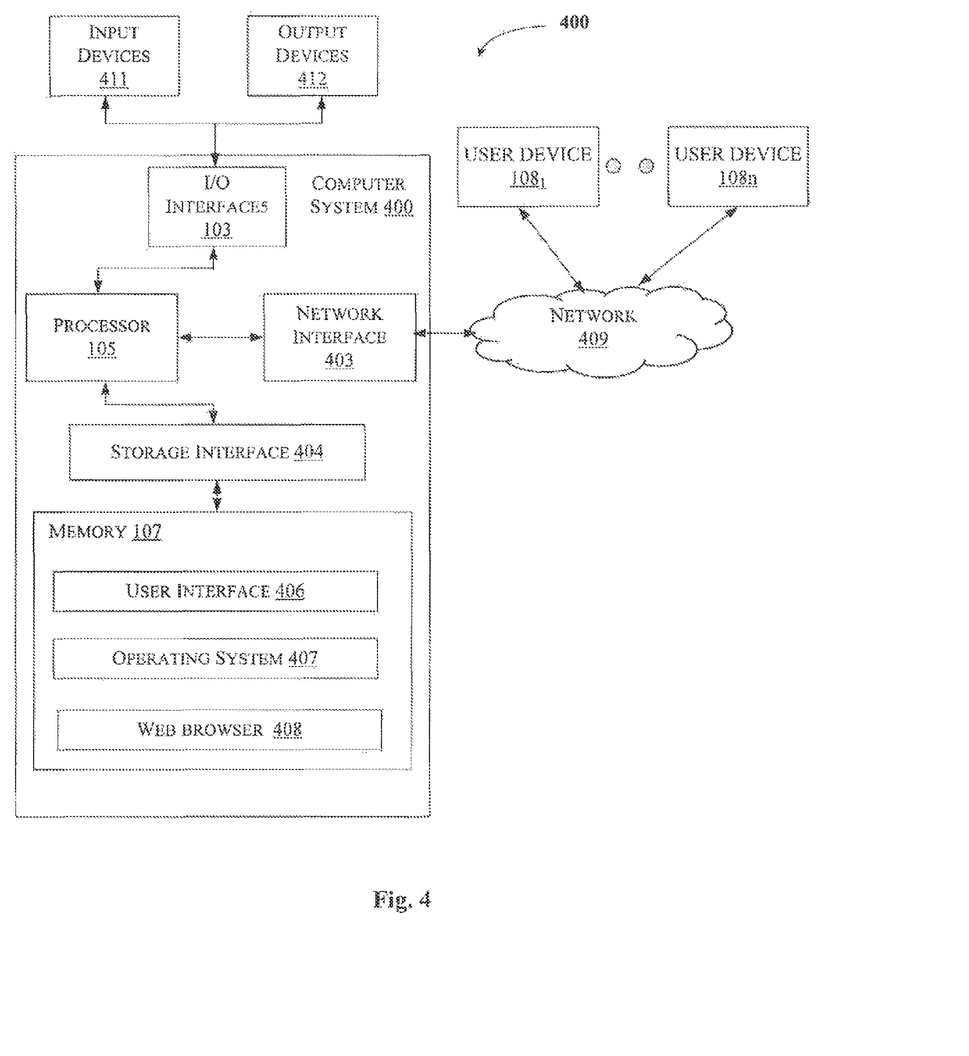
FIG. 4 illustrates a block diagram of an exemplary computer system for implementing embodiments consistent with the present disclosure.

FIG. 4 illustrates a block diagram of an exemplary computer system 400 for implementing embodiments consistent with the present invention. In an embodiment, the computer system 400 is used to optimize a test suite comprising plurality of test cases 113 using a test suite transformation system 101. The computer system 400 may comprise a central processing unit ("CPU" or "processor") 105. The processor 105 may comprise at least one data processor for executing program components for executing user- or system-generated business processes. A user may include a person, a person using a device such as such as those included in this invention, or such a device itself. The processor 105 may include specialized processing units such as integrated system (bus) controllers, memory management control units, floating point units, graphics processing units, digital signal processing units, etc.

The processor 105 may be disposed in communication with one or more input/output (I/O) devices (411 and 412) via I/O interface 103. The I/O interface 103 may employ communication protocols/method such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc. Using the I/O interface 103, the computer system 400 may communicate with one or more I/O devices (411 and 412).

In some embodiments, the processor 105 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with one or more user devices 108 (1, . . . , n). The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The one or more user devices 108 (1, . . . , n) may include, without limitation, personal computer(s), mobile devices such as cellular telephones, smartphones, tablet computers, eBook readers, laptop computers, notebooks, gaming consoles, or the like.

In some embodiments, the processor 105 may be disposed in communication with a memory 107 (e.g., RAM, ROM, etc. not shown in FIG. 4) via a storage interface 404. The storage interface 404 may connect to memory 107 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 107 may store a collection of program or database components, including, without limitation, user interface application 406, an operating system 407, web server 408 etc. In some embodiments, computer system 400 may store user/application data 406, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), International Business Machines (IBM) OS/2, Microsoft Windows (XP, Vista/7/8, etc.), Apple iOS, Google Android, Blackberry Operating System (OS), or the like. User interface 406 may facilitate display, execution, interaction, manipulation, or operation of program components through textual or graphical facilities. For example, user interfaces may provide computer interaction interface elements on a display system operatively connected to the computer system 400, such as cursors, icons, check boxes, menus, scrollers, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 400 may implement a web browser 408 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein In an embodiment, the present disclosure provides a method to optimize a test suite comprising plurality of test cases.

In an embodiment, the present disclosure provides a method for better representation of existing test suite, with no loss of test data.

In an embodiment, the present disclosure ensures a faster time to market of a product/software applications/software systems as the changes to the products/software applications/systems are tested faster and rolled out, with shorter regression test cycles.

In an embodiment, the present disclosure provides a method to optimize maintenance efforts required for each test cycle, since the time required for updating and maintaining the regression suite will be minimal.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Test suite transformation system |
| 103 | I/O Interface |
| 105 | Processor |
| 107 | Memory |
| 108 | User devices |
| 109 | Data sources |
| 111 | Data |
| 112 | Modules |

-continued

| Reference Number | Description |
| --- | --- |
| 113 | Test cases |
| 115 | Test data |
| 117 | Similarity index information |
| 119 | Test functions |
| 121 | Business process models |
| 123 | Other data |
| 125 | Receiving module |
| 127 | Analyzing module |
| 129 | Redundancy elimination module |
| 131 | Grouping module |
| 133 | Reconstruction module |
| 135 | Change management module |
| 137 | Other modules |

We claim:

1. A method for optimizing a test suite comprising plurality of test cases, the method comprising:
receiving, by a test suite transformation system, the plurality of test cases from one or more data sources;
identifying, by the test suite transformation system, at least one of one or more redundant test cases and one or more non-redundant test cases among the plurality of test cases in the test suite;
computing, by the test suite transformation system, similarity percentage between each of the one or more non-redundant test cases by comparing test description and test steps of each of the one or more non-redundant test cases with test description and the test steps of each of other non-redundant test cases;
grouping, by the test suite transformation system, each of the one or more non-redundant test cases into one or more clusters based on the similarity percentage;
identifying, by the test suite transformation system, one or more test functions in each of the one or more clusters for determining one or more reusable test functions in each of the one or more clusters, wherein the one or more reusable test functions are determined by identifying a source test function having maximum test string length and comparing each of remaining one or more test functions with the identified source test function; and
optimizing, by the test suite transformation system, the test suite by reconstructing the one or more test cases in each of the one or more clusters by replacing each of the one or more test cases with the identified one or more reusable test function references.

2. The method as claimed in claim 1 further comprises generating one or more business process models for each of the one or more reusable test functions.

3. The method as claimed in claim 2, wherein an integrated business model is generated using each of the one or more business process models for obtaining an integrated view of the test suite.

4. The method as claimed in claim 3 further comprises performing one or more change management operations on the integrated business model, wherein the one or more change management operations comprises:
generating one or more new test cases in the test suite by parsing through each of the one or more reconstructed test cases in the test suite;
comparing each of the one or more new test cases with the plurality of existing test cases in the test suite for identifying percentage of match between test description and test steps of the one or more new test cases and the plurality of existing test cases;
assigning a predetermined color to each of the one or more new test cases based on the percentage of match; and
performing one or more actions on the one or more new test cases in the test suite based on the color assigned to each of the one or more new test cases.

5. The method as claimed in claim 4, wherein the one or more actions performed on the one or more new test cases comprises at least one of deleting the new test case, translating the new test case and modifying the new test case.

6. The method as claimed in claim 1, wherein the one or more reusable test function references are paths referring to location of the one or more reusable test functions in the one or more clusters.

7. The method as claimed in claim 1, wherein the one or more redundant test cases in the test suite are eliminated from the test suite.

8. A test suite transformation system for optimizing a test suite comprising plurality of test cases, the test suite transformation system comprising:
a processor; and
a memory communicatively coupled to the processor, wherein the memory stores processor-executable instructions, which, on execution, causes the processor to:
receive the plurality of test cases from one or more data sources;
identify at least one of one or more redundant test cases and one or more non-redundant test cases among the plurality of test cases in the test suite;
compute similarity percentage between each of the one or more non-redundant test cases by comparing test description and test steps of each of the one or more non-redundant test cases with test description and the test steps of each of other non-redundant test cases;
group each of the one or more non-redundant test cases into one or more clusters based on the similarity percentage;
identify one or more test functions in each of the one or more clusters for determining one or more reusable test functions in each of the one or more clusters, wherein the one or more reusable test functions are determined by identifying a source test function having maximum test string length and comparing each of remaining one or more test functions with the identified source test function; and
optimize the test suite by reconstructing the one or more test cases in each of the one or more clusters by replacing each of the one or more test cases with the identified one or more reusable test function references.

9. The system as claimed in claim 8, wherein the instructions causes the processor to generate one or more business process models for each of the one or more reusable test functions.

10. The system as claimed in claim 9, wherein the instructions further causes the processor to generate an integrated business model using each of the one or more business process models for obtaining an integrated view of the test suite.

11. The system as claimed in claim 10, wherein the instructions causes the processor to perform one or more change management operations on the integrated business model, wherein the one or more change management operations comprises:
generating one or more new test cases in the test suite by parsing through each of the one or more reconstructed test cases in the test suite;

comparing each of the one or more new test cases with the plurality of existing test cases in the test suite for identifying percentage of match between test description and test steps of the one or more new test cases and the plurality of existing test cases;

assigning a predetermined color to each of the one or more new test cases based on the percentage of match; and performing one or more actions on the one or more new test cases in the test suite based on the color assigned to each of the one or more new test cases.

12. The system as claimed in claim 11, wherein the one or more actions performed on the one or more new test cases comprises at least one of deleting the new test case, translating the new test case and modifying the new test case.

13. The system as claimed in claim 8, wherein the one or more data sources may comprise at least one of a test management system, a storage unit storing one or more test cases and a test management tool.

14. The system as claimed in claim 8, wherein the one or more reusable test function references are paths referring to location of the one or more reusable test functions in the one or more clusters.

15. The system as claimed in claim 8, wherein the instructions causes the processor to eliminate one or more redundant test cases in the test suite.

16. A non-transitory computer readable medium including instructions stored thereon that when processed by at least one processor cause a test suite transformation system to perform operations comprising:

receiving the plurality of test cases from one or more data sources;

identifying at least one of one or more redundant test cases and one or more non-redundant test cases among the plurality of test cases in the test suite;

computing similarity percentage between each of the one or more non-redundant test cases by comparing test description and test steps of each of the one or more non-redundant test cases with test description and the test steps of each of other non-redundant test cases;

grouping each of the one or more non-redundant test cases into one or more clusters based on the similarity percentage;

identifying one or more test functions in each of the one or more clusters for determining one or more reusable test functions in each of the one or more clusters, wherein the one or more reusable test functions are determined by identifying a source test function having maximum test string length and comparing each of remaining one or more test functions with the identified source test function; and optimizing the test suite by reconstructing the one or more test cases in each of the one or more clusters by replacing each of the one or more test cases with the identified one or more reusable test function references.

* * * * *